US012696331B2

(12) United States Patent
Qi et al.

(10) Patent No.: US 12,696,331 B2
(45) Date of Patent: Jul. 28, 2026

(54) TUNNELED DIRECT LINK SETUP LATENCY MANAGEMENT FOR NON-COLLOCATED APs

(71) Applicant: Samsung Electronics Co., Ltd., Suwon-si (KR)

(72) Inventors: Yue Qi, Plano, TX (US); Boon Loong Ng, Plano, TX (US); Rubayet Shafin, Allen, TX (US); Peshal Nayak, Plano, TX (US); Vishnu Vardhan Ratnam, Plano, TX (US); Elliot Jen, Taipei City (TW)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/597,856

(22) Filed: Mar. 6, 2024

(65) Prior Publication Data
US 2024/0306228 A1     Sep. 12, 2024

Related U.S. Application Data

(60) Provisional application No. 63/604,364, filed on Nov. 30, 2023, provisional application No. 63/451,484, filed on Mar. 10, 2023.

(51) Int. Cl.
| | |
|---|---|
| *H04W 76/12* | (2018.01) |
| *H04W 52/02* | (2009.01) |
| *H04W 76/14* | (2018.01) |

(52) U.S. Cl.
CPC ....... *H04W 76/12* (2018.02); *H04W 52/0206* (2013.01); *H04W 76/14* (2018.02)

(58) Field of Classification Search
None
See application file for complete search history.

(56) References Cited

U.S. PATENT DOCUMENTS

| | | | |
|---|---|---|---|
| 10,257,753 B2 * | 4/2019 | Sirotkin | H04W 36/0061 |
| 10,492,206 B2 * | 11/2019 | Flynn | H04W 72/1215 |

(Continued)

FOREIGN PATENT DOCUMENTS

| | | | |
|---|---|---|---|
| EP | 4294064 | 12/2023 | |
| EP | 3817437 B1 * | 4/2024 | H04W 76/15 |

(Continued)

OTHER PUBLICATIONS

A. C. Snoeren, "Adaptive inverse multiplexing for wide-area wireless networks," Seamless Interconnection for Universal Services. Global Telecommunications Conference. Globecom'99. (Cat. No. 99CH37042), Rio de Janeiro, Brazil, 1999, pp. 1665-1672 vol. 3. (Year: 1999).*

(Continued)

*Primary Examiner* — Melvin H Pollack

(57) ABSTRACT

Methods and apparatuses for handling TDLS latency issues in non-collocated APs. A method of wireless communication performed by a first STA comprises: initiating a TDLS procedure between the first STA and a second STA via an AP of a plurality of APs that are associated with the first STA and the second STA, wherein: a first subset of the plurality of APs form a logical AP multi-link device (MLD), and the second STA is associated with either the first AP or a second AP of the plurality of APs; determining, based on the TDLS procedure, whether the plurality of APs are non-collocated; and adjusting a response time for receiving data from the plurality of APs or from the second STA based on the determination of whether the plurality of APs are non-collocated.

20 Claims, 13 Drawing Sheets

300

(56)  References Cited

U.S. PATENT DOCUMENTS

| | | | | |
|---|---|---|---|---|
| 11,026,110 B2 * | 6/2021 | Bergström | | H04W 48/18 |
| 11,057,826 B2 * | 7/2021 | Asterjadhi | | H04W 48/16 |
| 11,778,503 B1 * | 10/2023 | Han | | H04W 28/0263 |
| | | | | 370/329 |
| 11,785,473 B2 * | 10/2023 | Gundu Rao | | H04W 72/23 |
| | | | | 370/310 |
| 11,805,470 B2 * | 10/2023 | Kwon | | H04W 40/248 |
| 12,003,399 B2 * | 6/2024 | Guo | | H04W 76/15 |
| 12,108,491 B2 * | 10/2024 | Montemurro | | H04W 8/26 |
| 12,232,021 B2 * | 2/2025 | Kneckt | | H04W 76/15 |
| 12,363,771 B2 * | 7/2025 | Chu | | H04W 76/12 |
| 12,414,026 B2 * | 9/2025 | Sun | | H04W 74/0816 |
| 12,425,883 B2 * | 9/2025 | Gan | | H04W 24/02 |
| 12,426,086 B2 * | 9/2025 | Homchaudhuri | | H04W 28/02 |
| 12,446,086 B2 * | 10/2025 | Ajami | | H04W 76/12 |
| 12,507,296 B2 * | 12/2025 | Asterjadhi | | H04W 76/15 |
| 12,532,166 B2 * | 1/2026 | McCann | | H04W 12/0433 |
| 12,542,826 B2 * | 2/2026 | Bernardos | | H04L 67/1063 |
| 12,543,076 B2 * | 2/2026 | Fang | | H04W 36/0038 |
| 12,550,009 B2 * | 2/2026 | Fang | | H04W 12/041 |
| 12,563,502 B2 * | 2/2026 | Di Taranto | | H04W 52/262 |
| 2012/0127903 A1 | 5/2012 | Estevez et al. | | |
| 2014/0362689 A1 * | 12/2014 | Koc | | H04N 21/2401 |
| | | | | 370/230 |
| 2017/0041970 A1 | 2/2017 | Estevez et al. | | |
| 2018/0146390 A1 * | 5/2018 | Kim | | H04W 36/0011 |
| 2021/0136868 A1 * | 5/2021 | Nakajima | | H04W 24/02 |
| 2021/0378039 A1 * | 12/2021 | Cherian | | H04W 76/15 |
| 2021/0392705 A1 | 12/2021 | Jeong et al. | | |
| 2022/0124857 A1 * | 4/2022 | Patil | | H04W 76/14 |
| 2022/0141785 A1 | 5/2022 | Gan et al. | | |
| 2022/0287122 A1 | 9/2022 | Wang et al. | | |
| 2022/0345973 A1 | 10/2022 | Sun et al. | | |
| 2023/0128996 A1 * | 4/2023 | Cariou | | H04W 12/069 |
| | | | | 370/329 |
| 2023/0139206 A1 * | 5/2023 | Cariou | | H04W 76/15 |
| | | | | 370/328 |
| 2023/0337017 A1 * | 10/2023 | Cariou | | H04W 76/15 |
| 2023/0345267 A1 * | 10/2023 | Cariou | | H04W 72/1263 |
| 2023/0371101 A1 * | 11/2023 | Cariou | | H01Q 21/065 |
| 2023/0379855 A1 * | 11/2023 | Cariou | | H04W 60/04 |
| 2023/0380001 A1 * | 11/2023 | Cariou | | H04W 76/15 |
| 2023/0397275 A1 * | 12/2023 | Cariou | | H04W 76/15 |
| 2024/0008113 A1 * | 1/2024 | Huang | | H04W 76/11 |
| 2024/0089891 A1 * | 3/2024 | Kneckt | | H04W 48/14 |
| 2024/0098549 A1 * | 3/2024 | Huang | | H04W 28/0231 |
| 2024/0129271 A1 * | 4/2024 | Chitrakar | | H04L 61/103 |
| 2024/0215085 A1 * | 6/2024 | Guo | | H04W 76/14 |
| 2024/0224076 A1 * | 7/2024 | Ho | | H04W 24/02 |
| 2024/0283489 A1 * | 8/2024 | Hsu | | H04B 7/024 |
| 2024/0298349 A1 * | 9/2024 | Xia | | H04W 8/22 |
| 2024/0334509 A1 * | 10/2024 | Hwang | | H04W 74/08 |
| 2024/0349368 A1 * | 10/2024 | Dong | | H04W 76/15 |
| 2025/0159577 A1 * | 5/2025 | Patil | | H04W 36/0061 |
| 2025/0280442 A1 * | 9/2025 | Viger | | H04W 52/0216 |
| 2025/0287444 A1 * | 9/2025 | Kucharewski | | H04W 76/10 |
| 2025/0358878 A1 * | 11/2025 | Jang | | H04W 76/15 |

FOREIGN PATENT DOCUMENTS

| | | | | |
|---|---|---|---|---|
| KR | 10-2023-0010600 A | 1/2023 | | |
| WO | WO-2013138708 A1 * | 9/2013 | | H04W 36/22 |
| WO | 2022193945 A1 | 9/2022 | | |

OTHER PUBLICATIONS

C. Deng et al., "IEEE 802.11be Wi-Fi 7: New Challenges and Opportunities," in IEEE Communications Surveys & Tutorials, vol. 22, No. 4, pp. 2136-2166, Fourthquarter 2020. (Year: 2020).*

H. Ma, B. Wang, Y. Chen and K. J. Ray Liu, "Time-Reversal Tunneling Effects for Cloud Radio Access Network," in IEEE Transactions on Wireless Communications, vol. 15, No. 4, pp. 3030-3043, Apr. 2016. (Year: 2016).*

F. M. Abduljalil and S. K. Bodhe, "A survey of integrating IP mobility protocols and mobile ad hoc networks," in IEEE Communications Surveys & Tutorials, vol. 9, No. 1, pp. 14-30, First Quarter 2007. (Year: 2007).*

Nunez, David et al. "Multi-AP Coordinated Spatial Reuse for Wi-Fi 8: Group Creation and Scheduling," Arxiv, Networking and Internet Architecture, May 8, 2023. (Year: 2023).*

D. Samardzija, J. Pastalan, M. MacDonald, S. Walker and R. Valenzuela, "Compressed Transport of Baseband Signals in Radio Access Networks," in IEEE Transactions on Wireless Communications, vol. 11, No. 9, pp. 3216-3225, Sep. 2012. (Year: 2012).*

IEEE P802.11be—D3.0 Draft Standard for Information Technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)"; Jan. 2023; 999 pages.

IEEE Standards Association; IEEE Std 802.11—2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pgs.

IEEE 802.11-22/1910r1; "Seamless Roaming for UHR"; Jan. 15, 2023; 17 pages.

Extended European Search Report issued Oct. 22, 2025 regarding Application No. 24771128.6, 14 pages.

LAN/MAN Standards Committee of the IEEE Computer Society, "Draft Standard for Information technology—Telecommunications and information exchange between systems Local and metropolitan area networks—Specific requirements", Part 11: Wireless LAN Medium Access Control (MAC) and Physical Layer (PHY) Specifications, IEEE P802.11-REVmd™/D0.2, Aug. 2017, 3823 pages.

Ho et al., "Seamless Roaming for UHR", doc.: IEEE 802.11-22/1910r2, Feb. 2023, 18 pages.

International Search Report and Written Opinion issued Jun. 24, 2024 regarding International Application No. PCT/KR2024/003008, 8 pages.

Huang et al., "Proposed Draft Specification for ML General, MLD Authentication, MLD Association, and ML Setup", IEEE 802.11-20/1309r6, Sep. 2020, 35 pages.

* cited by examiner

400

500

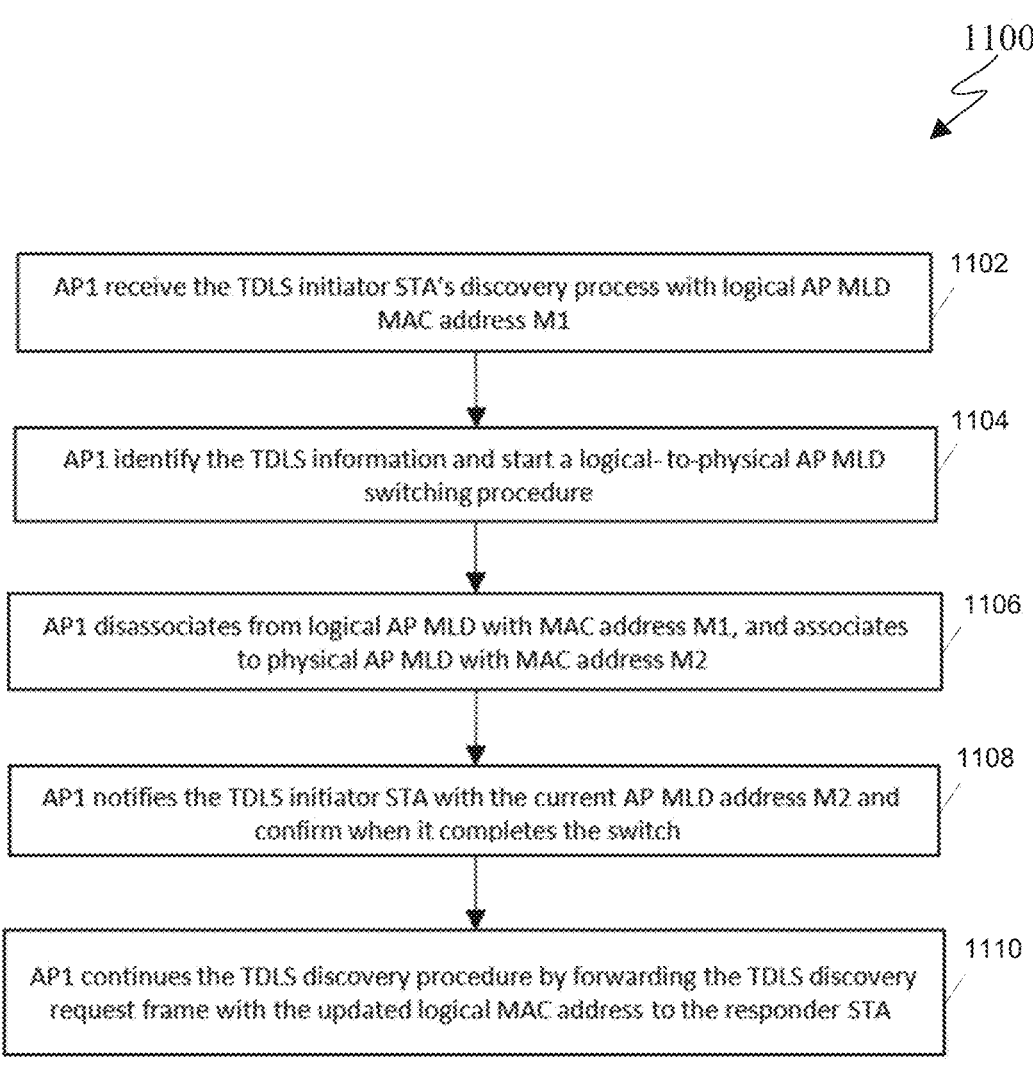

1100

AP1 receive the TDLS initiator STA's discovery process with logical AP MLD MAC address M1    1102

AP1 identify the TDLS information and start a logical- to-physical AP MLD switching procedure    1104

AP1 disassociates from logical AP MLD with MAC address M1, and associates to physical AP MLD with MAC address M2    1106

AP1 notifies the TDLS initiator STA with the current AP MLD address M2 and confirm when it completes the switch    1108

AP1 continues the TDLS discovery procedure by forwarding the TDLS discovery request frame with the updated logical MAC address to the responder STA    1110

FIG. 11

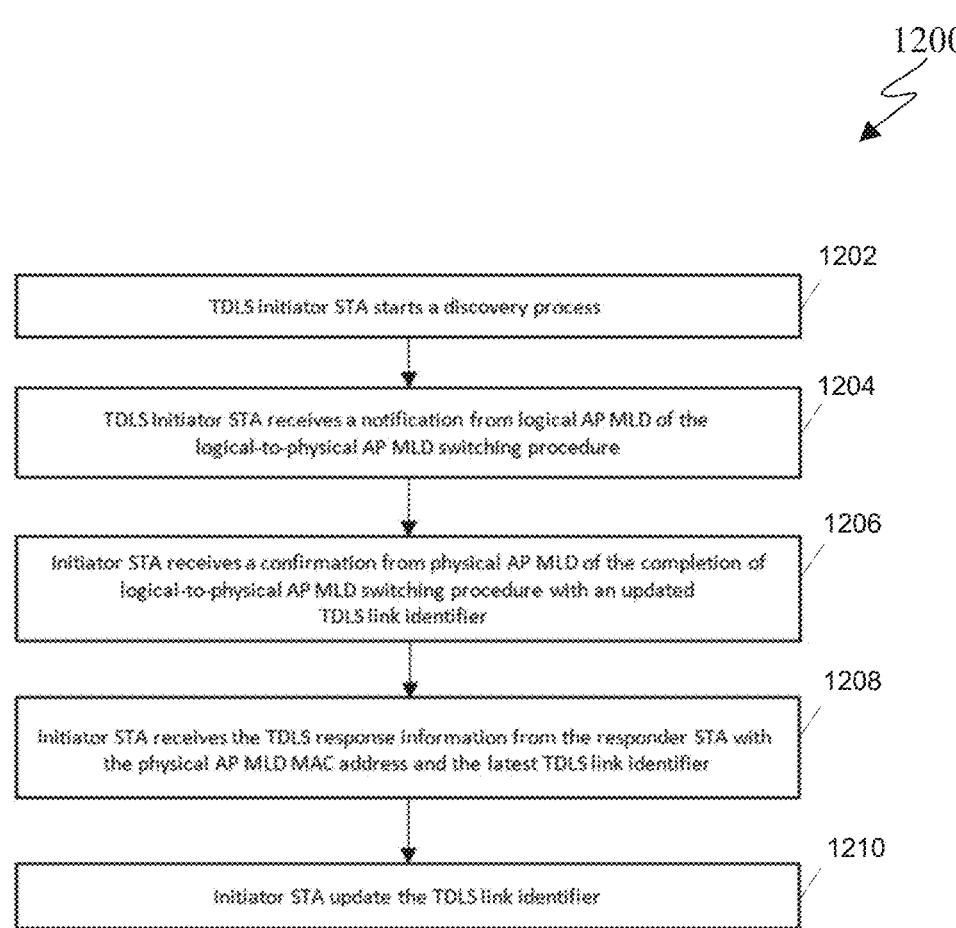

1200

1202
TDLS initiator STA starts a discovery process

1204
TDLS initiator STA receives a notification from logical AP MLD of the logical-to-physical AP MLD switching procedure 1206
Initiator STA receives a confirmation from physical AP MLD of the completion of logical-to-physical AP MLD switching procedure with an updated TDLS link identifier 1208
Initiator STA receives the TDLS response information from the responder STA with the physical AP MLD MAC address and the latest TDLS link identifier 1210
Initiator STA update the TDLS link identifier

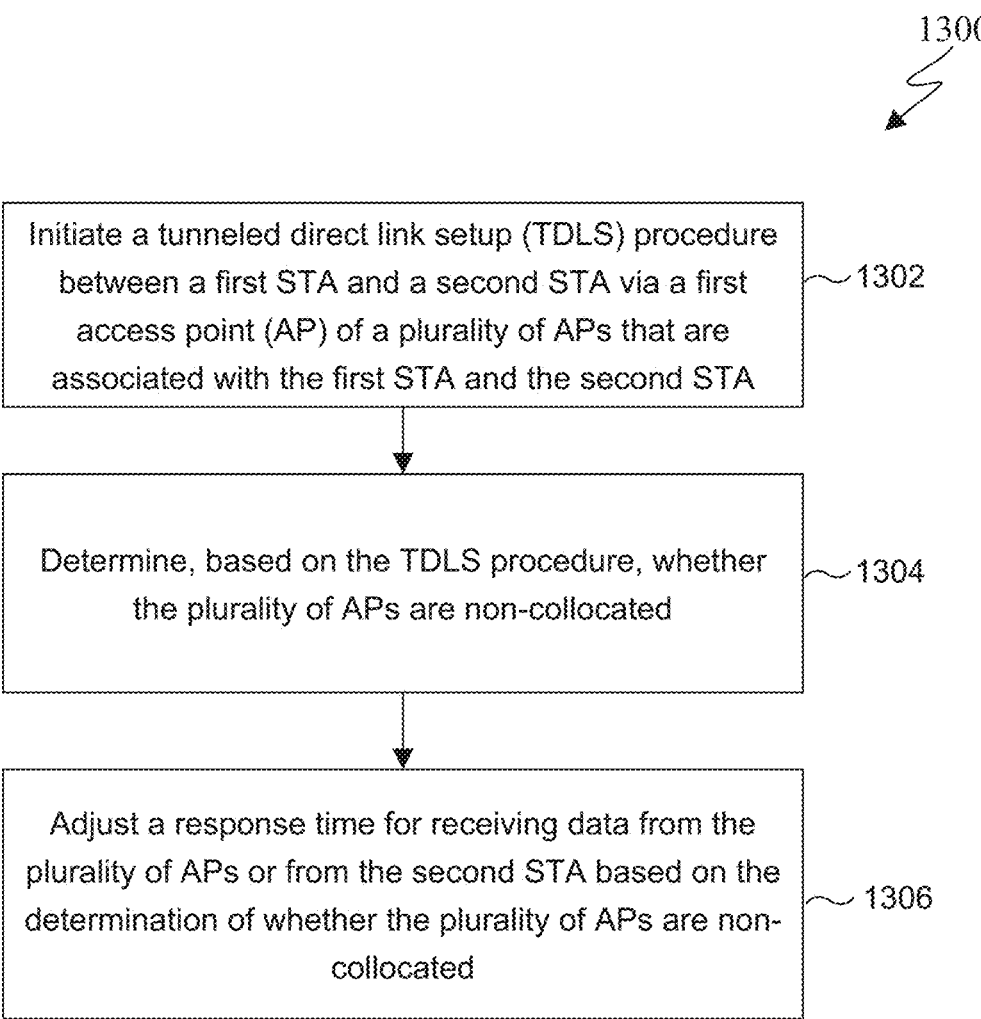

Initiate a tunneled direct link setup (TDLS) procedure between a first STA and a second STA via a first access point (AP) of a plurality of APs that are associated with the first STA and the second STA ~1302

Determine, based on the TDLS procedure, whether the plurality of APs are non-collocated ~1304

Adjust a response time for receiving data from the plurality of APs or from the second STA based on the determination of whether the plurality of APs are non-collocated ~1306

FIG. 13

TUNNELED DIRECT LINK SETUP LATENCY MANAGEMENT FOR NON-COLLOCATED APs

CROSS-REFERENCE TO RELATED APPLICATION(S) AND CLAIM OF PRIORITY

This application claims priority under 35 U.S.C. § 119(e) to U.S. Provisional Patent Application No. 63/451,484 filed on Mar. 10, 2023, and U.S. Provisional Patent Application No. 63/604,364 filed on Nov. 30, 2023, which are hereby incorporated by reference in their entirety.

TECHNICAL FIELD

This disclosure relates generally to latency related to tunneled direct link setup (TDLS) discovery, setup, and power saving, when access points (APs) affiliated with an AP multi-link device (MLD) are non-collocated.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for handling TDLS latency issues in non-collocated APs.

In one embodiment, a method of wireless communication performed by a first station (STA) comprises: initiating a tunneled direct link setup (TDLS) procedure between the first STA and a second STA via an access point (AP) of a plurality of APs that are associated with the first STA and the second STA, wherein: a first subset of the plurality of APs form a logical AP multi-link device (MLD), and the second STA is associated with either the first AP or a second AP of the plurality of APs; determining, based on the TDLS procedure, whether the plurality of APs are non-collocated; and adjusting a response time for receiving data from the plurality of APs or from the second STA based on the determination of whether the plurality of APs are non-collocated.

In another embodiment, a first STA is provided, comprising: a transceiver; and a processor operably coupled to the transceiver. The processor is configured to: initiate a TDLS procedure between the first STA and a second STA via a first AP of a plurality of APs that are associated with the first STA and the second STA, wherein: a first subset of the plurality of APs form a logical AP MLD, and the second STA is associated with either the first AP or a second AP of the plurality of APs; determine, based on the TDLS procedure, whether the plurality of APs are non-collocated; and adjust a response time for receiving data from the plurality of APs or from the second STA based on the determination of whether the plurality of APs are non-collocated.

In yet another embodiment, a first AP is provided, comprising: a transceiver; and a processor operably coupled to the transceiver. The processor configured to: initiate a TDLS procedure between a first STA and a second STA, the first AP associated with a plurality of APs that are associated with the first STA and the second STA, wherein: a first subset of the plurality of APs form a logical AP MLD, and the second STA is associated with either the first AP or a second AP of the plurality of APs; and adjust a response time for transmitting data to the first STA based on a determination associated with the TDLS procedure whether the plurality of APs are non-collocated.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 11 illustrates a flow diagram of an example method for AP side TDLS switching logical to physical AP MLD according to various embodiments of the present disclosure;

FIG. 12 illustrates a flow diagram of an example method for STA side TDLS switching logical to physical AP MLD according to various embodiments of the present disclosure; and FIG. 13 illustrates a flow diagram of an example method for wireless communication performed by a station device according to embodiments of the present disclosure.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: [1] IEEE P802.11be –D3.0 "Part 11: Wireless LAN Medium Access Control (MAC) and Physical Layer (PHY) Specifications—Amendment 8: Enhancements for extremely high throughput (EHT)"; [2] IEEE 802.11-2020—IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications.

Embodiments of the present disclosure recognize that Logical AP MLD can help improve flexibility, scalability, and mobility. However, how the TDLS discovery, setup, and power saving etc., would take place under such architecture is unclear. For example, if the APs affiliated with the AP MLD are non-collocated, then transmissions may incur delay for communicating a message from one non-collocated AP to the other. This may have serious consequences for TDLS discovery, setup, teardown, and power saving. For example, upon sending the TDLS Setup Request frame, the TDLS initiator STA expects to receive the TDLS Setup Response frame within a certain time window. However, if the response frame arrival is delayed due to non-colocation of the affiliated APs, then the TDLS initiator STA shall terminate the setup procedure. This may render the connection between P2P very challenging. Therefore, there needs to be a mechanism to handle TDLS discovery, setup, and, teardown, power saving, etc., process when the APs affiliated with the AP MLD are non-collocated.

Accordingly, embodiments of the present disclosure provide mechanisms to handle the latency-related issues related to TDLS discovery, setup, and power saving, when the APs affiliated with the AP MLD are non-collocated.

Figure 1:
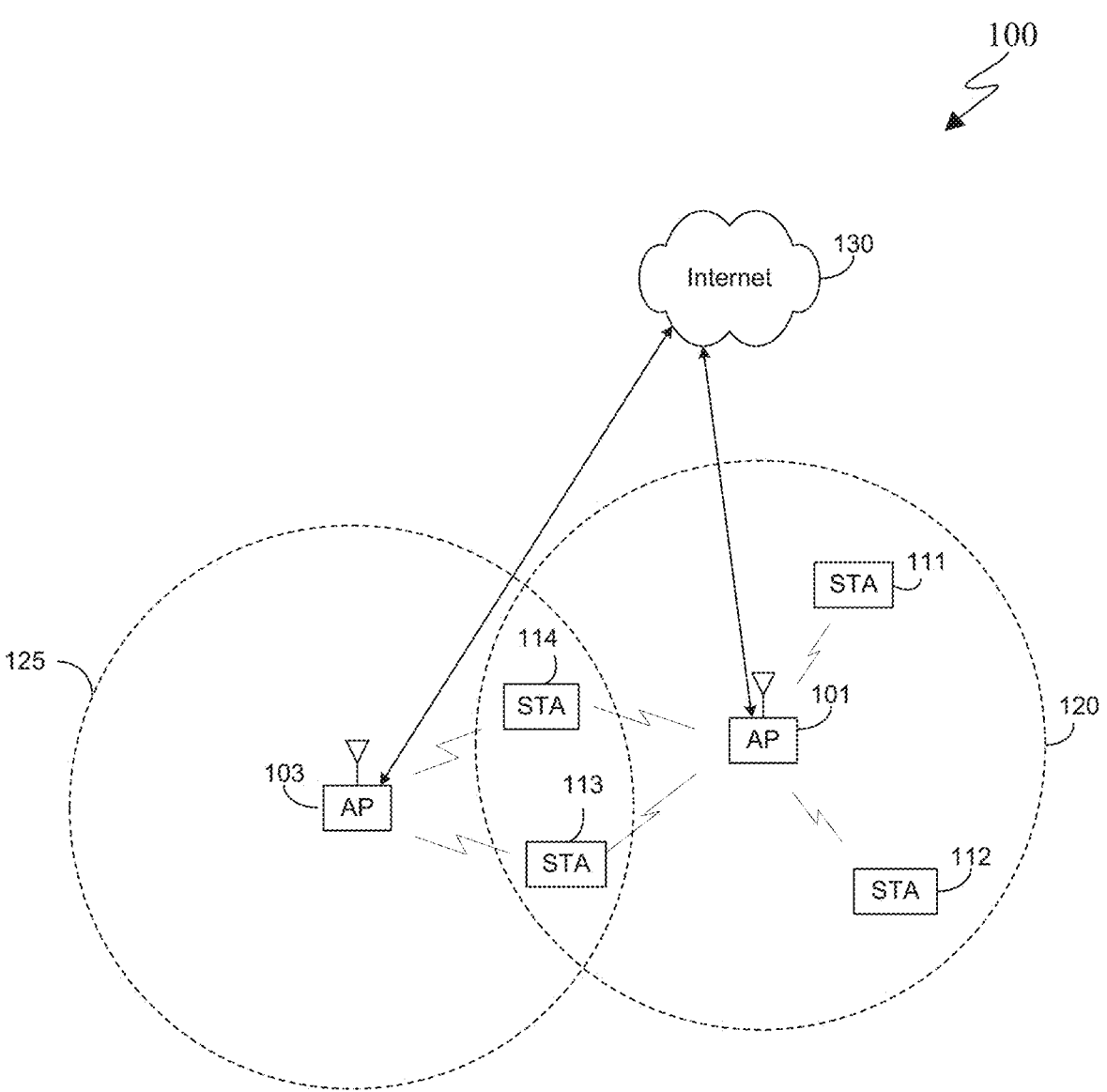
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for supporting TDLS latency issues in non-collocated APs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
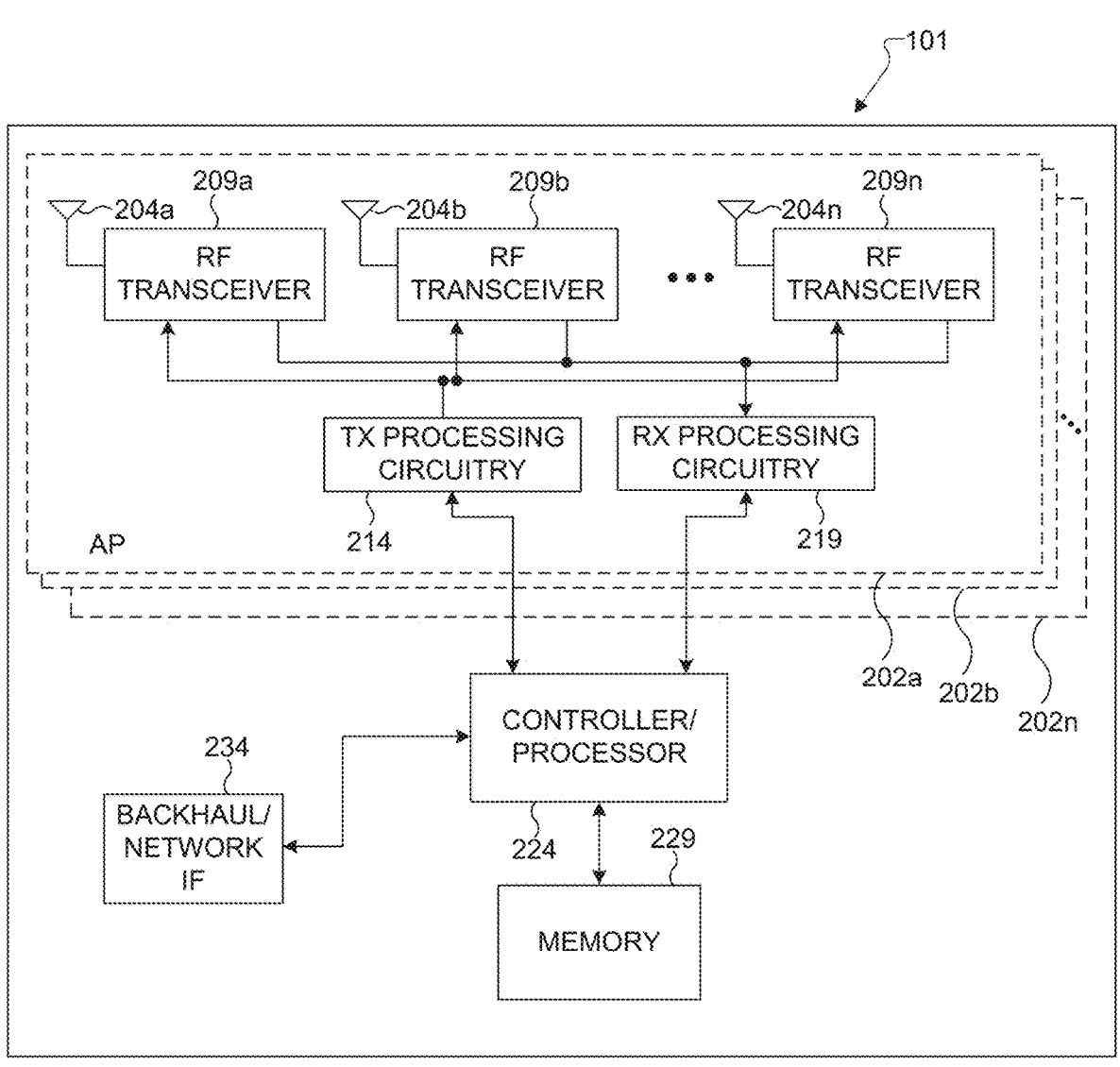
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including supporting TDLS latency issues in non-collocated APs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for supporting TDLS latency issues in non-collocated APs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
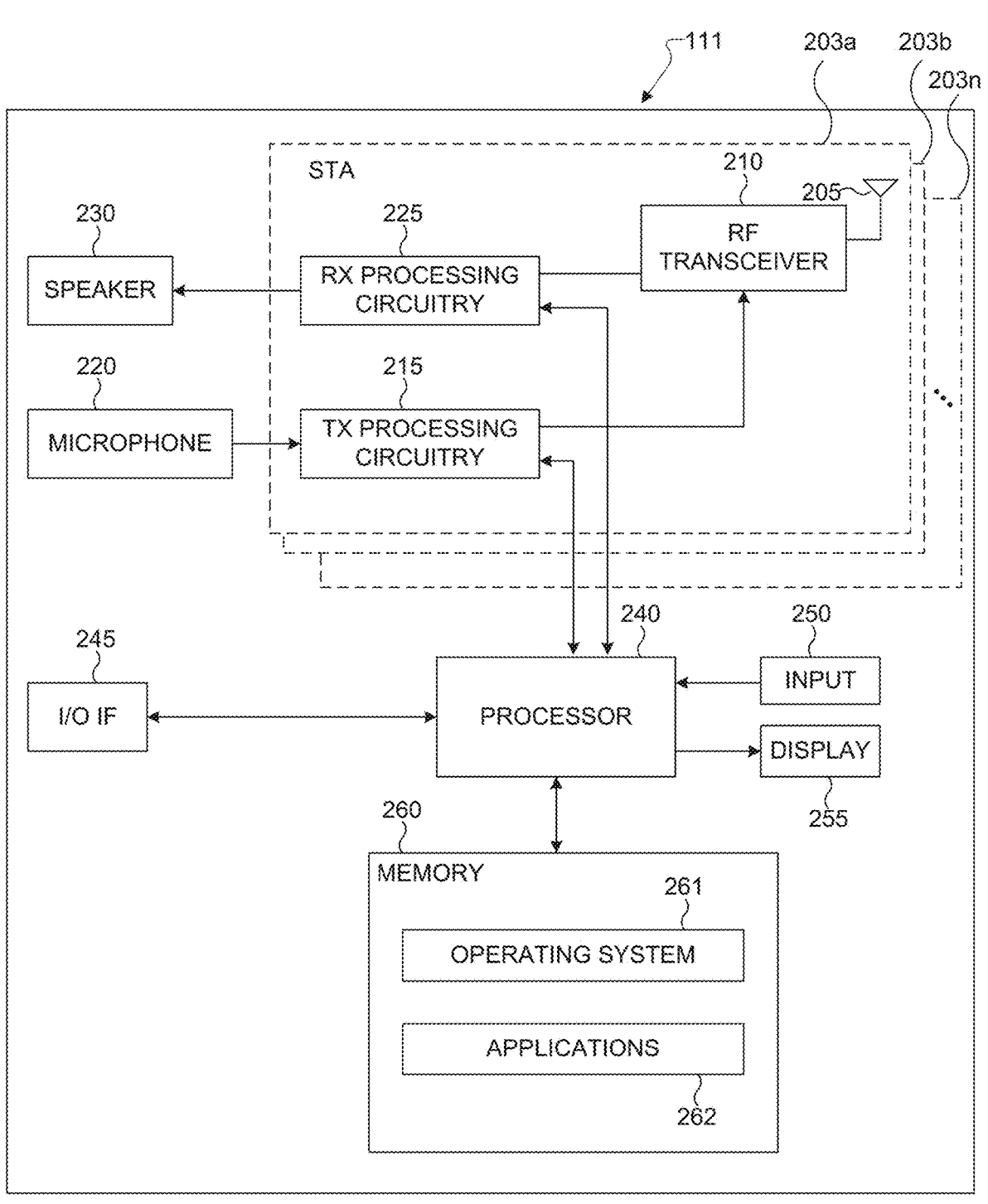
FIG. 2B illustrates an example STA according to various embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support TDLS latency issues in non-collocated APs. In some embodiments, the controller/processor 240 includes at least one microprocessor or microcontroller.

The controller/processor 240 is also capable of executing other processes and programs resident in the memory 260, such as operations for supporting TDLS latency issues in non-collocated APs. The controller/processor 240 can move data into or out of the memory 260 as required by an executing process. In some embodiments, the controller/processor 240 is configured to execute a plurality of applications 262, such as applications for supporting TDLS latency issues in non-collocated APs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
FIG. 3 illustrates an example TDLS discovery procedure and an example TDLS setup procedure according to various embodiments of the present disclosure.
Figure 3:
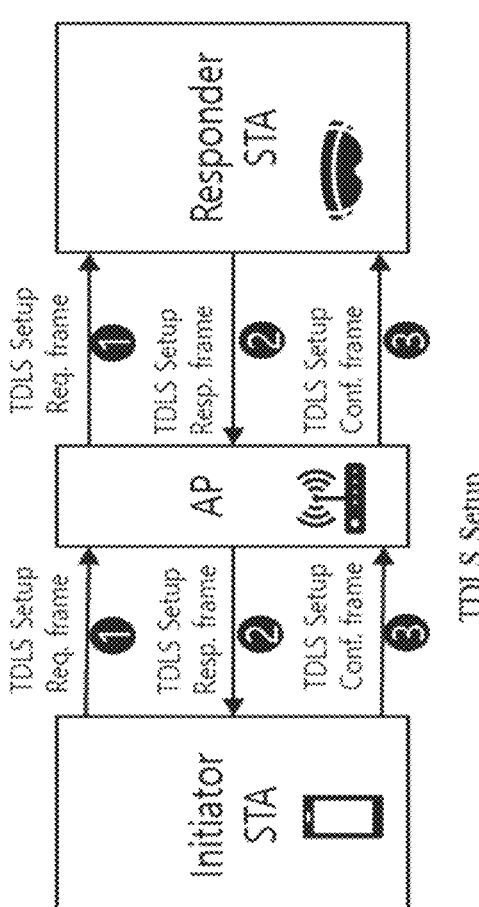
Figure 3:
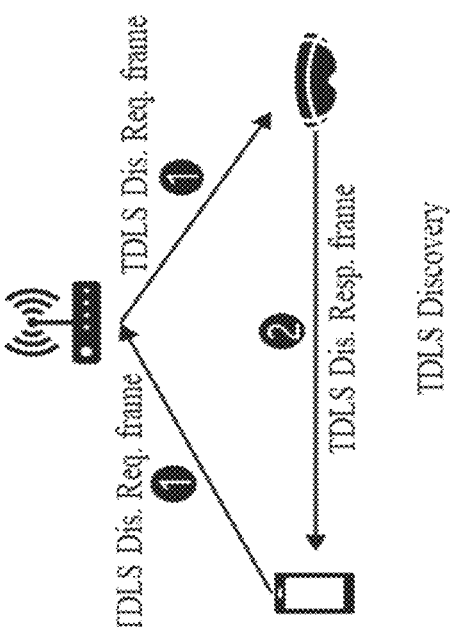

FIG. 3 illustrates example TDLS discovery and TDLS setup procedures 300 according to various embodiments of the present disclosure. The embodiment of the example TDLS discovery and TDLS setup procedures 300 shown in FIG. 3 is for illustration only. Other embodiments of the example TDLS discovery and TDLS setup procedures 300 could be used without departing from the scope of this disclosure.

Tunneled Direct Link Setup (TDLS) is a key feature for peer-to-peer (P2P) communication between two non-AP STAs affiliated with two non-AP MLD. The main procedures in 802.11ax (Clause 11.20 [1]) and 802.11be (Clause 35.3.21 [1]) of building two or more TDLS direct links can be summarized as TDLS discovery, TDLS direct-link setup, TDLS direct-link teardown, TDLS channel switch, and TDLS direct link over a single link in multi-link operation (MLO). As illustrated in FIG. 3, a brief introduction of each step is shown below:

TDLS Discovery: a TDLS initiator STA may send a TDLS Discovery Request frame to an individual Destination Address, through the AP. TDLS STA sends TDLS Discovery Response frame to the requesting STA via the direct path and informs its capabilities (e.g., support TDLS or not, supported rate/channels).

TDLS Setup: To establish a TDLS direct link, the initiator STA sends TDLS Setup Request frame; the TDLS responder STA accepts and respond with a TDLS Setup Response frame; The initiator STA sends a TDLS Setup confirm frame. All the procedures are transmitted through AP.

TDLS teardown: A TDLS peer STA shall disable the direct link and delete the related parameters after transmitting TDLS Teardown frame.

TDLS power saving: A STA that intends to enter TDLS peer power saving mode (PSM) shall send a TDLS Peer PSM Request frame to the TDLS peer STA, including a proposed periodic wakeup schedule. When the TDLS peer PSM responder accepts the schedule, it shall respond with a TDLS Peer PSM Response frame. The TDLS Peer PSM request frame can be transmitted either through AP or direct link. The TDLS Peer PSM Response frame can be only transmit via direct link.

Figure 4:
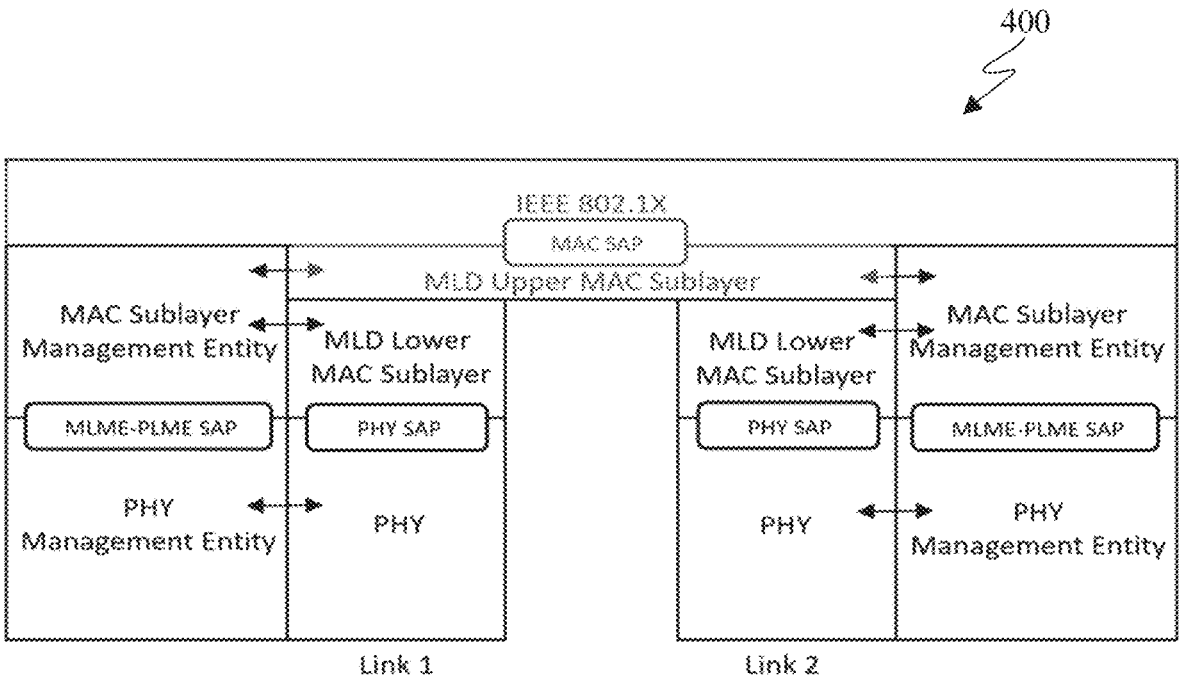
FIG. 4 illustrates an example reference model for an MLD for two links according to various embodiments of the present disclosure.

FIG. 4 illustrates an example reference model for an MLD for two links 400 according to various embodiments of the present disclosure. The embodiment of the example reference model for an MLD for two links 400 shown in FIG. 4 is for illustration only. Other embodiments of the example reference model for an MLD for two links 400 could be used without departing from the scope of this disclosure.

In 802.11be, multiple link operation (MLO) is a significant feature to support the transmission over multiple links. As illustrated in FIG. 4, this MLO framework allows a non-AP MLD to switch links with minimal signaling overhead and delay. The MLO framework can have an architecture comprising of a physical layer, a MAC lower sub-layer and an upper MAC sub-layer. The architecture can be as depicted in FIG. 4 for the case of two APs.

Figure 5:
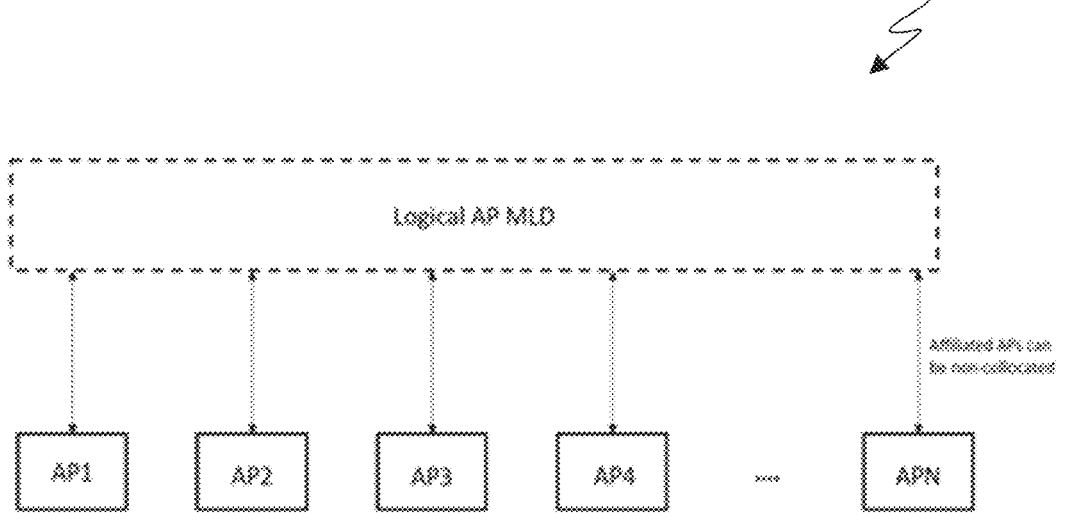
FIG. 5 illustrates an example of a logical AP MLD according to various embodiments of the present disclosure.

FIG. 5 illustrates an example of a logical AP MLD 500 according to various embodiments of the present disclosure. The embodiment of the example logical AP MLD 500 shown in FIG. 5 is for illustration only. Other embodiments of the example logical AP MLD 500 could be used without departing from the scope of this disclosure.

In UHR-SG, low-latency with high reliability transmission is targeted. In order to achieve the goal, a logical AP MLD concept is provided. As illustrated in FIG. 5, AP 1 to AP N can be non-collocated and can form one logical AP MLD containing the upper MAC sublayer. In addition, any one or more of these APs can have a common data path to a router or a central controller. The logical AP MLD concept can bring benefits to reduce the delay in seamless transition and handover from one AP to another.

Figure 6:
FIG. 6 illustrates an example of a direct link between two STAs via logical AP MLD according to various embodiments of the present disclosure.
Figure 6:
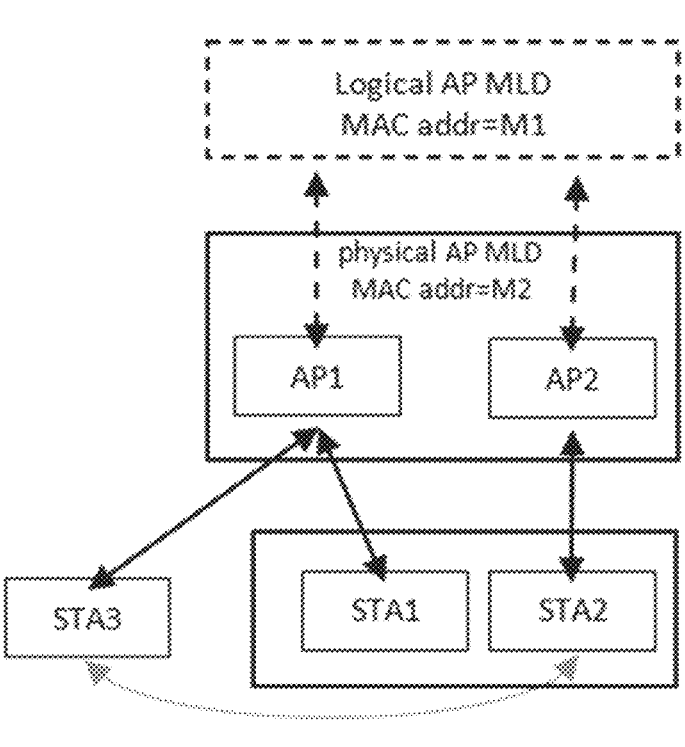

FIG. 6 illustrates an example of a direct link between two STAs via logical AP MLD 600 according to various embodiments of the present disclosure. The embodiment of the example of a direct link between two STAs via logical AP MLD 600 shown in FIG. 6 is for illustration only. Other embodiments of the example of a direct link between two STAs via logical AP MLD 600 could be used without departing from the scope of this disclosure.

In one embodiment, the device that initiates TDLS discovery can extend the response time if it knows that APs are non-collocated. For example, as illustrated in FIG. 6, STA1 and STA2 are collocated in a non-AP MLD, and STA3 is a legacy device. STA1 and STA3 are associated with the same AP1 affiliated with an AP MLD, and STA2 is associated with AP2 affiliated with a non-AP MLD. STA2 and STA3 want to establish a direct link, which may suffer the delay during the discovery and/or setup procedures. Therefore, the STA can adjust the response time window based on the knowledge and nature of AP's (non)collocation. For example, an initiator STA can set a short response time window if its associated APs of the peer STAs are collocated, and set a longer response time window if those are non-collocated.

Figure 7:
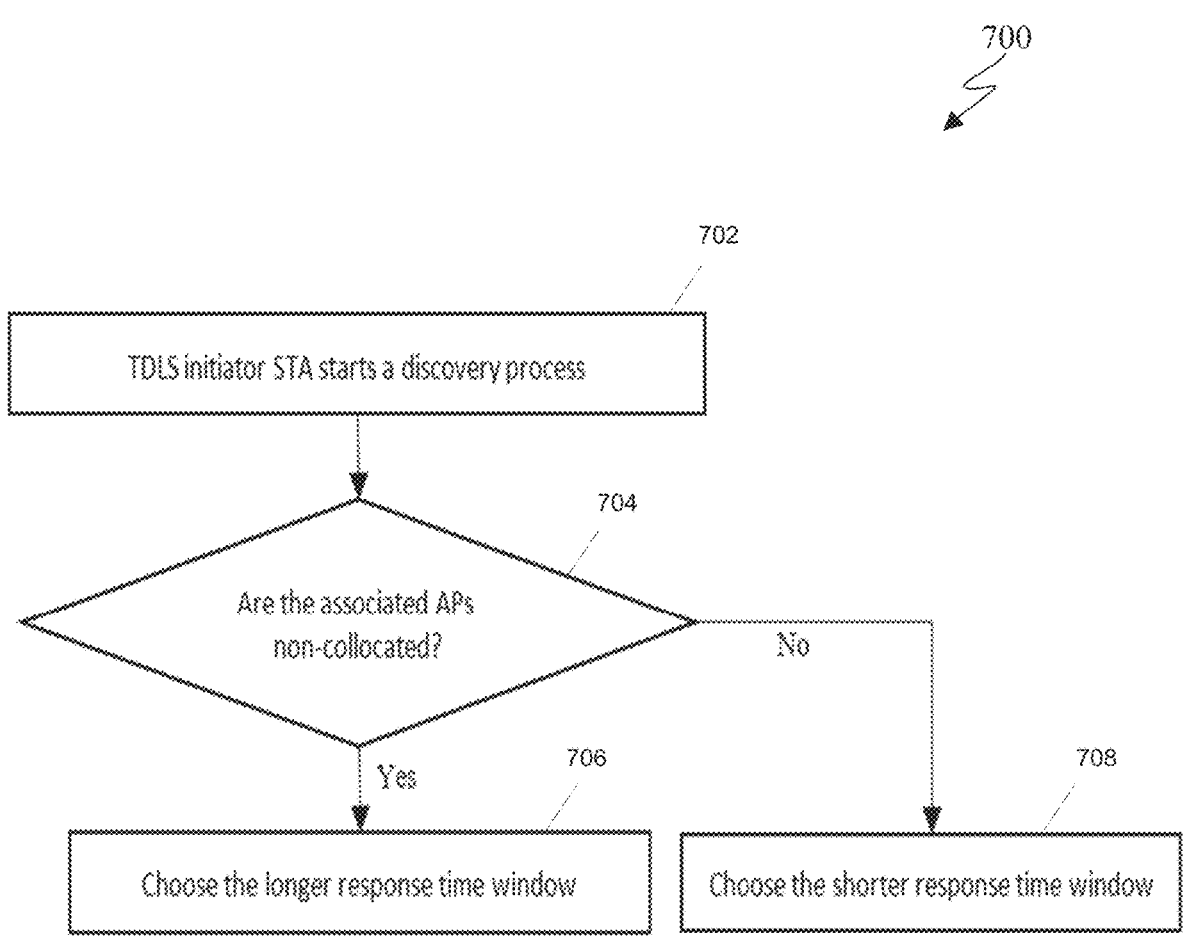
FIG. 7 illustrates a flow diagram of an example method performed by a STA for choosing a presetting response time window according to various embodiments of the present disclosure.

FIG. 7 illustrates a flow diagram of an example method 700 performed by a STA for choosing a presetting response time window according to various embodiments of the present disclosure. The embodiment of the example method 700 performed by a STA for choosing a presetting response time window shown in FIG. 7 is for illustration only. Other embodiments of the example method 700 performed by a STA for choosing a presetting response time window could be used without departing from the scope of this disclosure.

As illustrated in FIG. 7, the method 700 begins at step 702, where a TDLS initiator STA starts a discovery process. At step 704, a determination is made whether the associated APs are non-collocated. If the associated APs are non-collocated, then at step 706, the longer response time window is chosen. If the associated APs are not non-collocated, then at step 708, the shorter response time window is chosen.

In one embodiment, the TDLS setup response frame should be received within dot11TDLSResponseTimeout, otherwise, the TDLS initiator STA shall terminate and reattempt at a later point based on the new extended response timer, and discard the TDLS Setup Response frame after a certain time of attempting reattempts. Thus, the device that initiates the TDLS setup procedure should extend the response time, for example, dot11TDLSResponseTimeout, if it knows that APs are non-collocated. The information of the TDLS setup response action field should also be updated since the current specification does not indicate any action when latency issues happen.

According to another embodiment, the responder STA should also extend the TDLS setup confirmation time window during the TDLS setup procedure, if the associated APs are non-collocated.

In one embodiment, if the device that initiates TDLS discovery does not know that its affiliated APs are non-collocated, the APs should notify the TDLS initiator STA of its non-collocation nature and the time window extension request for a longer delay. For example, the AP can send a message to the initiator STA indicating its non-collocated architecture (e.g., the MAC address of the non-collocated AP affiliated with the AP MLD, if the non-collocated AP belongs to another control center, its ability with one or more upper MAC sublayers, etc.). The non-collocated APs can also send a message to request extending the response time window. For example, the non-collocated AP may also indicate the preset values or default value of the time window, the non-collocated AP can send a frame in which the value of the dot11TDLSResponseTimeout is set longer than default. An example of information fields table is in Table. 1.

TABLE 1

Information fields that can be present in the request frame

| Information field | Description |
|---|---|
| Reason code | A field to indicate the reason for extending the response window. For example, the AP are non-collocated which should be set 1, otherwise, the code can be set as 0. |
| Response Time Extension Request | A field to indicate the response time extension is being requested by the AP. For instance, the request can either increase a certain value of the STA's default response time window, or the non-collocated AP can indicate the expected latency to the TDLS initiator STA and set the Responses Time Extension Request with that value. |
| Timeout value | A timeout value to indicate the duration for which the above request can be considered as valid. |

Figure 8:
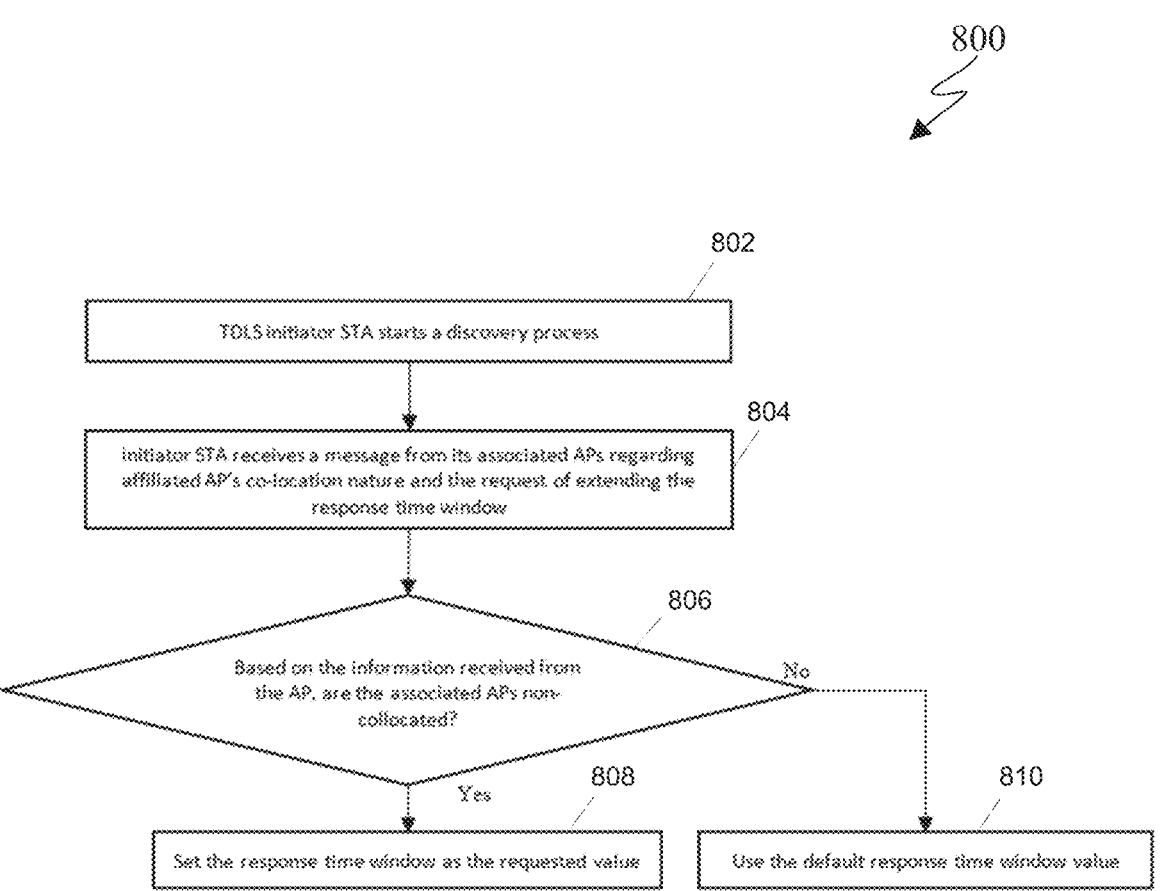
FIG. 8 illustrates a flow diagram of an example method for extending a time window for a TDLS discovery response in non-collocated APs according to various embodiments of the present disclosure.

FIG. 8 illustrates a flow diagram of an example method 800 for extending a time window for a TDLS discovery response in non-collocated APs according to various embodiments of the present disclosure. The embodiment of the example method 800 for extending a time window for a TDLS discovery response in non-collocated APs shown in FIG. 8 is for illustration only. Other embodiments of the example method 800 for extending a time window for a TDLS discovery response in non-collocated APs could be used without departing from the scope of this disclosure.

As illustrated in FIG. 8, the method 800 begins at step 802, where a TDLS initiator STA starts a discovery process. At step 804, the initiator STA receives a message from its associated APs regarding affiliated AP's co-location nature and the request of extending the response time window. At step 806, a determination is made whether the associated APs are non-collocated. If the associated APs are non-collocated, then at step 808, the response time window is set as the requested value. If the associated APs are not non-collocated, then at step 810, the default response time window value is used.

According to another embodiment, an information element (IE) containing the non-collocated MAP nature may be included in the beacon or probe frames, such that the associated AP may be aware of the nature of the non-collocated AP(s). When the initiator STA starts the TDLS discovery and setup procedures with the associated AP containing the IE, it may extend the dot11TDLSResponseTimeout and expect a longer time from the non-collocated AP(s) and the responder STA. The IE may contain the logical and local address information, the status of the AP(s) (whether in collocated or non-collocated mode, if the collocated AP is busy and only non-collocated AP should serve), etc.

In one embodiment, the TDLS peer power saving mode (PSM) who chooses to transmit the TDLS Peer PSM Request frame to activate a new wakeup schedule via the AP path should be expected a delay and may extend the response time window if the APs are non-collocated.

Figure 9:
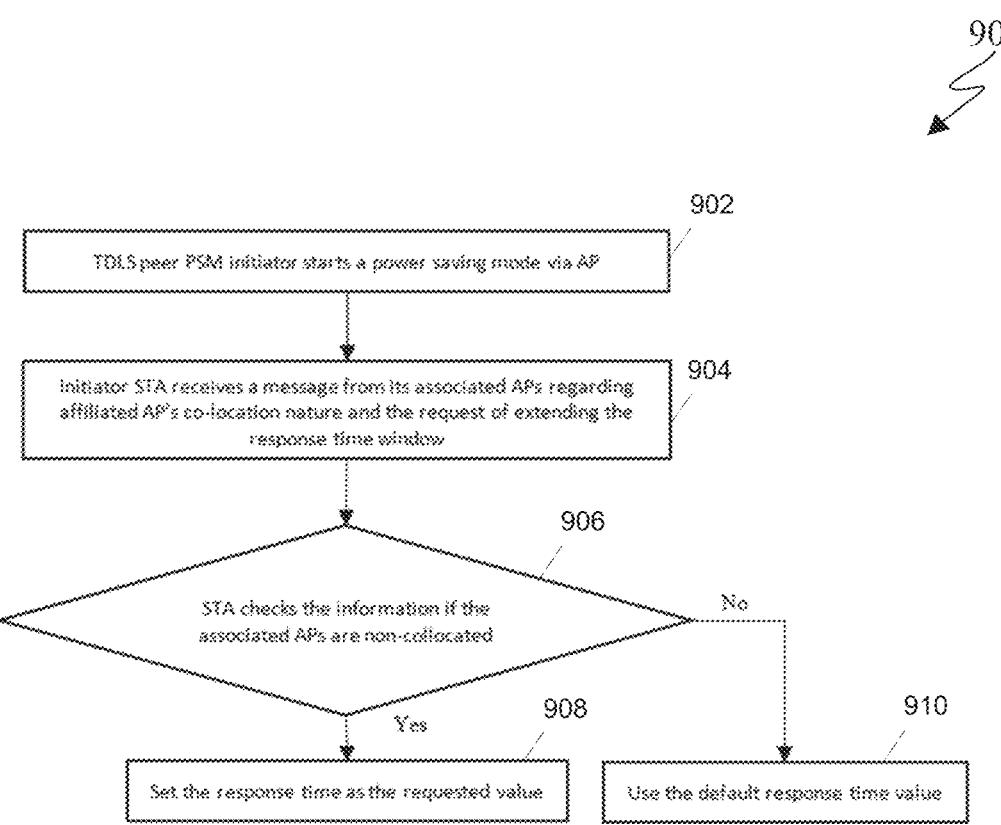
FIG. 9 illustrates a flow diagram of an example method for extending a time window for a TDLS power saving mode according to various embodiments of the present disclosure.

FIG. 9 illustrates a flow diagram of an example method 900 for extending a time window for a TDLS power saving mode according to various embodiments of the present disclosure. The embodiment of the example method 900 for extending a time window for a TDLS power saving mode shown in FIG. 9 is for illustration only. Other embodiments of the example method 900 for extending a time window for a TDLS power saving mode could be used without departing from the scope of this disclosure.

As illustrated in FIG. 9, the method 900 begins at step 902, where a TDLS peer PSM initiator starts a power saving mode via AP. At step 904, the initiator STA receives a message from its associated APs regarding affiliated AP's co-location nature and the request of extending the response time window. At step 906, a determination is made whether the associated APs are non-collocated. If the associated APs are non-collocated, then at step 908, the response time window is set as the requested value. If the associated APs are not non-collocated, then at step 910, the default response time window value is used.

According to another embodiment, if the associated APs are non-collocated, then the TDLS Peer PSM Request frame is not transmitted through the AP, and is sent directly to the peer STAs over the TDLS direct link.

In one embodiment, for TDLS Peer Traffic Indication frame transmission, and if the APs are non-collocated, the TDLS peer traffic response time window, for example, dot11TDLSResponseTimeout, can be considered to be extended. Otherwise, the STA can tear down the direct link.

In one embodiment, when the AP(s) can be connected either logically or physically, a method to flexibly switch the AP from logically to physically connected and vice versa is designed to support TDLS. The TDLS initiator STA transmits a discovery frame through its associated non-collocated AP, the non-collocated AP may disassociate from logical AP MLD and move to the collocated AP, by switching the MAC address of the non-collocated AP MLD to the local AP MLD.

Figure 10:
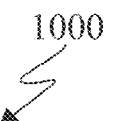
FIG. 10 illustrates an example TDLS associated with logical and physical AP MLD according to various embodiments of the present disclosure.
Figure 10:
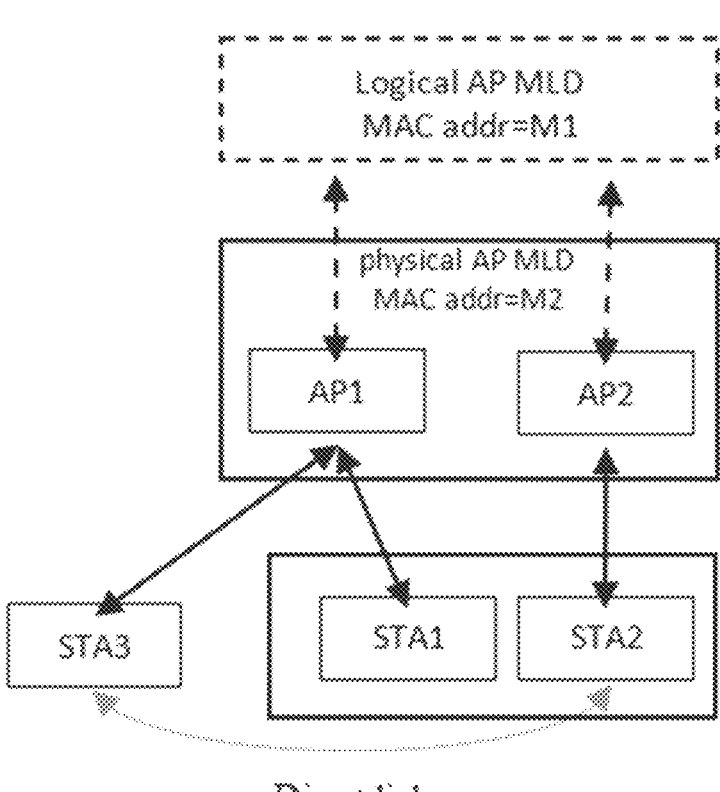

FIG. 10 illustrates an example TDLS associated with logical and physical AP MLD 1000 according to various embodiments of the present disclosure. The embodiment of the example TDLS associated with logical and physical AP MLD 1000 shown in FIG. 10 is for illustration only. Other embodiments of the example TDLS associated with logical and physical AP MLD 1000 could be used without departing from the scope of this disclosure.

As illustrated in FIG. 10, STA3 starts a TDLS initiation through AP1 and logical AP MLD with MAC address M1, and when the logical AP MLD receives the TDLS discovery frame, it disassociates from the logical AP MLD and moves to physical AP MLD with MAC address M2. Thus, the TDLS initiator STA that was associated with the logical AP MLD is now associated with the physical AP MLD.

FIG. 11 illustrates a flow diagram of an example method 1100 for AP side TDLS switching logical to physical AP MLD according to various embodiments of the present disclosure. The embodiment of the example method 1100 for AP side TDLS switching logical to physical AP MLD shown in FIG. 11 is for illustration only. Other embodiments of the example method 1100 for AP side TDLS switching logical to physical AP MLD could be used without departing from the scope of this disclosure.

As illustrated in FIG. 11, the method 1100 begins at step 1102, where AP1 receives the TDLS initiator STA's discovery process with logical AP MLD MAC address M1. At step 1104, AP1 identifies the TDLS information and starts a logical-to-physical AP MLD switching procedure. At step 1106, AP1 disassociates from logical AP MLD with MAC address M1, and associates to physical AP MLD with MAC address M2. At step 1108, AP1 notifies the TDLS initiator STA with the current AP MLD address M2 and confirm when it completes the switch. At step 1110, AP1 continues the TDLS discovery procedure by forwarding the TDLS discovery request frame with the updated logical MAC address to the responder STA.

FIG. 12 illustrates a flow diagram of an example method 1200 for STA side TDLS switching logical to physical AP MLD according to various embodiments of the present disclosure. The embodiment of the example method 1200 for STA side TDLS switching logical to physical AP MLD shown in FIG. 12 is for illustration only. Other embodiments of the example method 1200 for STA side TDLS switching logical to physical AP MLD could be used without departing from the scope of this disclosure.

As illustrated in FIG. 12, the method 1200 begins at step 1202, where the TDLS initiator STA starts a discovery process. At step 1204, the TDLS initiator STA receives a notification from the logical AP MLD of the logical-to-physical AP MLD switching procedure. At step 1206, the initiator STA receives a confirmation from physical AP MLD of the completion of logical-to-physical AP MLD switching procedure with an updated TDLS link identifier. At step 1208, the initiator STA receives the TDLS response information from the responder STA with the physical AP MLD MAC address and the latest TDLS link identifier. At step 1210, the initiator STA updates the TDLS link identifier.

To avoid dis/re-association and reduce the latency, according to another embodiment, the logical-to-physical AP MLD switching procedure may be realized between the APs. The logical AP MLD may transfer the context, such as data, association information, secrecy key, etc., to physical AP. The physical AP MLD may also transfer the context to the logical AP. The STA can associate with the MAC address without distinguishing the logical and physical AP MLD.

FIG. 13 illustrates a flow diagram of a method 1300 for wireless communication performed by a first STA according to embodiments of the present disclosure. The example method 1300 shown in FIG. 13 is for illustration only. Other embodiments of the example method 1300 could be used without departing from the scope of this disclosure.

As illustrated in FIG. 13, the method 1300 begins at step 1302, where the first STA initiates a TDLS procedure between the first STA and a second STA via an AP of a plurality of APs that are associated with the first STA and the second STA, wherein: a first subset of the plurality of APs form a logical AP MLD, and the second STA is associated with either the first AP or a second AP of the plurality of APs. At step 1304, the first STA determines, based on the TDLS procedure, whether the plurality of APs are non-collocated. At step 1306, the first STA adjusts a response time for receiving data from the plurality of APs or from the second STA based on the determination of whether the plurality of APs are non-collocated.

In one embodiment, the first STA determines whether the first AP of the plurality of APs is non-collocated with one or more other APs of the plurality of APs, wherein the first STA and the second STA are associated with a same AP of the logical AP MLD.

In one embodiment, the first STA and the second STA are respectively associated with other APs of the plurality of APs.

In one embodiment, the first STA receives a message from the plurality of APs regarding collocation of the plurality of APs, and receives a request from the plurality of APs to adjust the response time.

In one embodiment, the first STA receives, from the second STA, a request to extend a TDLS response time when the plurality of APs are non-collocated.

In one embodiment, the TDLS procedure includes a TDLS peer power saving mode (PSM) procedure, a TDLS discovery procedure, a TDLS setup procedure, or a TDLS teardown procedure, and the first STA determines whether the plurality of APs are non-collocated comprises receiving a message from the plurality of APs regarding collocation of the plurality of APs, and receives a request from the plurality of APs to adjust the response time when the plurality of APs are non-collocated.

In one embodiment, a second subset of the plurality of APs forms a physical AP MLD, and the first STA receives, from the logical AP MLD, an indication associated with switching a MAC address that is associated with a non-collocated AP of the plurality of APs from the logical AP MLD to the physical AP MLD.

In one embodiment, the first STA receives from either the second STA or the non-collocated AP of the plurality of the APs, TDLS response information including the MAC address that was switched from the logical AP MLD to the physical AP MLD.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of wireless communication performed by a first station (STA), the method comprising:
   initiating a tunneled direct link setup (TDLS) procedure between the first STA and a second STA via a first access point (AP) of a plurality of APs that are associated with the first STA and the second STA, wherein:
      a first subset of the plurality of APs form a logical AP multi-link device (MLD), and
      the second STA is associated with either the first AP or a second AP of the plurality of APs;
   determining, based on the TDLS procedure, whether the plurality of APs are non-collocated; and adjusting a response time for receiving data from the plurality of APs or from the second STA based on the determination of whether the plurality of APs are non-collocated.

2. The method of claim 1, wherein determining whether the plurality of APs are non-collocated comprises determining whether the first AP of the plurality of APs is non-collocated with one or more other APs of the plurality of APs, wherein the first STA and the second STA are associated with a same AP of the logical AP MLD.

3. The method of claim 1, wherein the first STA and the second STA are respectively associated with other APs of the plurality of APs.

4. The method of claim 1, wherein:

determining whether the plurality of APs are non-collocated comprises receiving a message from the plurality of APs regarding collocation of the plurality of APs; and adjusting the response time for receiving data from the plurality of APs comprises receiving a request from the plurality of APs to adjust the response time.

5. The method of claim 1, further comprising receiving, from the second STA, a request to extend a TDLS response time when the plurality of APs are non-collocated.

6. The method of claim 1, wherein:

the TDLS procedure includes a TDLS peer power saving mode (PSM) procedure, a TDLS discovery procedure, a TDLS setup procedure, or a TDLS teardown procedure, determining whether the plurality of APs are non-collocated comprises receiving a message from the plurality of APs regarding collocation of the plurality of APs, and adjusting the response time for receiving data from the plurality of APs comprises receiving a request from the plurality of APs to adjust the response time when the plurality of APs are non-collocated.

7. The method of claim 1, wherein a second subset of the plurality of APs forms a physical AP MLD, the method further comprising:

receiving, from the logical AP MLD, an indication associated with switching a media access control (MAC) address that is associated with a non-collocated AP of the plurality of APs from the logical AP MLD to the physical AP MLD.

8. The method of claim 7, further comprising receiving, from either the second STA or the non-collocated AP of the plurality of the APs, TDLS response information including the MAC address that was switched from the logical AP MLD to the physical AP MLD.

9. A first station (STA) comprising:

a transceiver; and a processor operably coupled to the transceiver, the processor configured to:

initiate a tunneled direct link setup (TDLS) procedure between the first STA and a second STA via a first access point (AP) of a plurality of APs that are associated with the first STA and the second STA, wherein:

a first subset of the plurality of APs form a logical AP multi-link device (MLD), and the second STA is associated with either the first AP or a second AP of the plurality of APs;

determine, based on the TDLS procedure, whether the plurality of APs are non-collocated; and adjust a response time for receiving data from the plurality of APs or from the second STA based on the determination of whether the plurality of APs are non-collocated.

10. The first STA of claim 9, wherein to determine whether the plurality of APs are non-collocated, the processor is further configured to determine whether the first AP of the plurality of APs is non-collocated with one or more other APs of the plurality of APs, wherein the first STA and the second STA are associated with a same AP of the logical AP MLD.

11. The first STA of claim 9, wherein the first STA and the second STA are respectively associated with other APs of the plurality of APs.

12. The first STA of claim 9, wherein:

to determine whether the plurality of APs are non-collocated, the processor is further configured to receive a message from the plurality of APs regarding collocation of the plurality of APs; and to adjust the response time for receiving data from the plurality of APs, the processor is further configured to receive a request from the plurality of APs to adjust the response time.

13. The first STA of claim 9, wherein the processor is further configured to receive, from the second STA, a request to extend a TDLS response time when the plurality of APs are non-collocated.

14. The first STA of claim 9, wherein:

the TDLS procedure includes a TDLS peer power saving mode (PSM) procedure, a TDLS discovery procedure, a TDLS setup procedure, or a TDLS teardown procedure, to determine whether the plurality of APs are non-collocated, the processor is further configured to receive a message from the plurality of APs regarding collocation of the plurality of APs, and to adjust the response time for receiving data from the plurality of APs, the processor is further configured to receive a request from the plurality of APs to adjust the response time when the plurality of APs are non-collocated.

15. The first STA of claim 9, wherein:

a second subset of the plurality of APs forms a physical AP MLD, and the processor is further configured to receive, from the logical AP MLD, an indication associated with switching a media access control (MAC) address that is associated with a non-collocated AP of the plurality of APs from the logical AP MLD to the physical AP MLD.

16. The first STA of claim 15, wherein the processor is further configured to receive, from either the second STA or the non-collocated AP of the plurality of the APs, TDLS response information including the MAC address that was switched from the logical AP MLD to the physical AP MLD.

17. A first access point (AP) comprising:

a transceiver; and a processor operably coupled to the transceiver, the processor configured to:

initiate a tunneled direct link setup (TDLS) procedure between a first station (STA) and a second STA, the first AP associated with a plurality of APs that are associated with the first STA and the second STA, wherein:

a first subset of the plurality of APs form a logical AP multi-link device (MLD), and the second STA is associated with either the first AP or a second AP of the plurality of APs; and adjust a response time for transmitting data to the first STA based on a determination associated with the TDLS procedure whether the plurality of APs are non-collocated.

18. The first AP of claim 17, wherein:

the TDLS procedure includes a TDLS peer power saving mode (PSM) procedure, a TDLS discovery procedure, a TDLS setup procedure, or a TDLS teardown procedure, and the transceiver is configured to:

transmit a message from the plurality of APs regarding collocation of the plurality of APs, and transmit a request from the plurality of APs to adjust the response time when the plurality of APs are non-collocated.

19. The first AP of claim 17, wherein:

a second subset of the plurality of APs forms a physical AP MLD, and the processor is further configured to transmit, via the transceiver, an indication associated with switching a media access control (MAC) address that is associated with a non-collocated AP of the plurality of APs from the logical AP MLD to the physical AP MLD.

20. The first AP of claim 19, wherein the processor is further configured to transmit, via the transceiver, TDLS response information associated with the non-collocated AP of the plurality of the APs including the MAC address that was switched from the logical AP MLD to the physical AP MLD.

\* \* \* \* \*